United States Patent
Okamura et al.

(10) Patent No.: US 11,271,228 B2
(45) Date of Patent: Mar. 8, 2022

(54) FUEL CELL SYSTEM AND CONTROL METHOD THEREOF

(71) Applicant: HONDA MOTOR CO., LTD., Tokyo (JP)

(72) Inventors: Yuji Okamura, Wako (JP); Koichi Takaku, Wako (JP); Koichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 589 days.

(21) Appl. No.: 16/226,782

(22) Filed: Dec. 20, 2018

(65) Prior Publication Data
US 2019/0198898 A1 Jun. 27, 2019

(30) Foreign Application Priority Data
Dec. 21, 2017 (JP) .............................. JP2017-245144

(51) Int. Cl.
*H01M 8/04302* (2016.01)
*H01M 8/04223* (2016.01)
(Continued)

(52) U.S. Cl.
CPC ..... *H01M 8/04268* (2013.01); *H01M 8/0258* (2013.01); *H01M 8/0267* (2013.01);
(Continued)

(58) Field of Classification Search
CPC ......... H01M 8/04268; H01M 8/04302; H01M 8/0258; H01M 8/0267; H01M 8/0422;
(Continued)

(56) References Cited

U.S. PATENT DOCUMENTS

| | | | |
|---|---|---|---|
| 6,358,638 B1 | 3/2002 | Rock et al. | |
| 2012/0183875 A1* | 7/2012 | Yumita | H01M 8/04223 |
| | | | 429/434 |
| 2015/0044586 A1* | 2/2015 | Yabutani | H01M 8/0612 |
| | | | 429/423 |

FOREIGN PATENT DOCUMENTS

| | | | |
|---|---|---|---|
| JP | 2001-189164 | | 7/2001 |
| JP | 2010-170927 | | 8/2010 |
| JP | 2010170927 | * | 8/2010 |

OTHER PUBLICATIONS

JP 2010170927 MT (Year: 2010).*
Japanese Office Action for Japanese Patent Application No. 2017-245144 dated Nov. 4, 2020.

* cited by examiner

*Primary Examiner* — Alexander Usyatinsky
(74) *Attorney, Agent, or Firm* — Amin, Turocy & Watson, LLP

(57) ABSTRACT

A fuel cell system includes a gas-liquid separator, a circulation flow path, a connecting flow path, and a distribution flow path. The gas-liquid separator separates fuel exhaust gas, which flows therein via a fuel exhaust gas flow path, into gas and liquid. The circulation flow path causes a gas discharge port of the gas-liquid separator and the fuel gas supply flow path to communicate with each other. The connecting flow path causes a liquid discharge port of the gas-liquid separator to communicate with the oxygen-containing gas supply flow path, via a drain valve. The distribution flow path causes the circulation flow path or a portion of the fuel gas supply flow path that is on a downstream side of a connecting section connecting to the circulation flow path to communicate with a downstream side of the drain valve of the connecting flow path via an opening and closing valve.

10 Claims, 2 Drawing Sheets

(51) Int. Cl.
*H01M 8/0258* (2016.01)
*H01M 8/0267* (2016.01)
*H01M 8/04014* (2016.01)
*H01M 8/12* (2016.01)
*H01M 8/0432* (2016.01)

(52) U.S. Cl.
CPC ... *H01M 8/04022* (2013.01); *H01M 8/04253* (2013.01); *H01M 8/04302* (2016.02); *H01M 8/0432* (2013.01); *H01M 8/12* (2013.01)

(58) Field of Classification Search
CPC ... H01M 8/04253; H01M 8/0432; H01M 8/12
See application file for complete search history.

FUEL CELL SYSTEM AND CONTROL METHOD THEREOF

CROSS-REFERENCE TO RELATED APPLICATION

This application is based upon and claims the benefit of priority from Japanese Patent Application No. 2017-245144 filed on Dec. 21, 2017, the contents of which are incorporated herein by reference.

BACKGROUND OF THE INVENTION

Field of the Invention

The present invention relates to a fuel cell system that generates electric power by supplying fuel gas and oxygen-containing gas to an anode and a cathode of a fuel cell, and also relates to a control method of the fuel cell system.

Description of the Related Art

As an example, a solid polymer type of fuel cell includes an electrolyte electrode assembly, e.g. a membrane electrode assembly (MEA), in which an anode is arranged on one surface of an electrolyte membrane formed from a polymer ion exchange membrane and a cathode is arranged on the other surface of the electrolyte membrane. The membrane electrode assembly is sandwiched by separators to form a power generation cell (single cell). Usually, a certain number of power generation cells needed to obtain a desired amount of power generation are stacked, and incorporated in a fuel cell vehicle or the like, for example, in a stacked state.

With this type of fuel cell, the optimal operational temperature range for power generation is approximately 70° C. to 100° C., for example, and particularly when used in a vehicle or the like, it is believed that this fuel cell would be started in a cold environment at a temperature below freezing or the like. In this case, the speed of the power generation reaction in the fuel cell drops according to how low the temperature is, and there are cases where it takes a long time for the fuel cell to reach the optimal operational temperature range using only the heating caused by this power generation reaction. Therefore, in order to quickly warm up the fuel cell to the operational temperature range described above even when starting up at a temperature below freezing or the like, a method is proposed for low-temperature start-up of a fuel cell system in Japanese Laid-Open Patent Publication No. 2001-189164, for example. With this method, oxygen-containing gas is supplied to a cathode and fuel gas is supplied from a fuel gas supply apparatus, to cause an exothermic reaction in a cathode catalyst.

SUMMARY OF THE INVENTION

The main object of the present invention is to provide a fuel cell system that can quickly warm up a fuel cell by effectively using discharge fluid which is discharged, through a drain valve, from a liquid discharge port of a gas-liquid separator into which fuel exhaust gas flows.

Another object of the present invention is to provide a fuel cell system that is capable of quickly warming up a fuel cell while effectively unfreezing of a drain valve even when the drain valve is frozen.

Yet another object of the present invention is to provide a control method for this fuel cell system.

According to a first aspect of the present invention, there is provided a fuel cell system for generating electric power by supplying fuel gas to an anode of a fuel cell via a fuel gas supply flow path and supplying an oxygen-containing gas to a cathode of the fuel cell via an oxygen-containing gas supply flow path, the fuel cell system including a fuel exhaust gas flow path configured to allow fuel exhaust gas discharged from the anode to flow therethrough, a gas-liquid separator into which the fuel exhaust gas flows via the fuel exhaust gas flow path, the gas-liquid separator being configured to separate the fuel exhaust gas into a gas and a liquid, a circulation flow path configured to cause a gas discharge port of the gas-liquid separator and the fuel gas supply flow path to be in communication with each other, a connecting flow path configured to cause a liquid discharge port of the gas-liquid separator to be in communication with the oxygen-containing gas supply flow path, via a drain valve, a distribution flow path configured to cause the circulation flow path or a portion of the fuel gas supply flow path that is on a downstream side of a connecting section connecting to the circulation flow path to be in communication with a downstream side of the drain valve in the connecting flow path, and an opening and closing valve configured to open and close the distribution flow path.

In this fuel cell system, an electrochemical reaction (power generation reaction) is caused by supplying the fuel gas to the anode and supplying the oxygen-containing gas to the cathode. Due to the heat of this power generation reaction, the fuel exhaust gas discharged from the anode of the fuel cell to the fuel exhaust gas path is also heated.

Furthermore, this fuel exhaust gas contains an unconsumed portion of fuel gas that was not consumed in the power generation reaction (referred to below simply as an unconsumed portion), excess water, and the like. Therefore, by causing the fuel exhaust gas to flow into the gas-liquid separator via the fuel exhaust gas flow path, the discharge gas containing the unconsumed portion and having its liquid water separated is discharged from the gas discharge port to the circulation flow path. The circulation flow path is connected to the fuel gas supply flow path via the connecting section. Accordingly, the unconsumed portion can be supplied again to the anode via the circulation flow path and the fuel gas supply flow path to be used in the power generation reaction. Here, the discharge gas is obtained as a result of the fuel exhaust gas heated in the manner described above flowing through the gas-liquid separator, and therefore the discharge gas is heated in the same manner as the fuel exhaust gas.

On the other hand, since the liquid discharge port of the gas-liquid separator is connected to the connecting flow path via the drain valve, by opening the drain valve, the discharge fluid containing the unconsumed portion and the liquid water is discharged from this liquid discharge port to the connecting flow path. In this way, by causing the unconsumed portion contained in the discharge fluid to flow into the oxygen-containing gas supply flow path, this unconsumed portion can be supplied along with the oxygen-containing gas to the cathode. Due to this, the exothermic reaction in the cathode catalyst can be caused.

Accordingly, since the fuel cell can be heated by the heat of the exothermic reaction in the cathode catalyst as well as by the heat of the power generation reaction described above, it is possible to quickly warm up the fuel cell. Furthermore, in normal cases, the unconsumed portion contained in the discharge fluid released into the atmosphere or the like can be efficiently utilized, and therefore it is possible to increase the usage efficiency of the fuel gas supplied to the fuel cell system. In this case, it is also possible to remove the need for equipment for diluting the unconsumed portion contained in the discharge fluid, or the like before being vented to atmosphere.

It should be noted that, in a case where the fuel cell is started up in a cold environment where the temperature is below freezing, it is possible that the liquid attached to the drain valve freezes and the drain valve does not open even when the valve opening instructions are issued. In this way, even in a case where the unconsumed portion contained in the discharge fluid cannot be supplied to the cathode due to the drain valve freezing, it is possible to quickly warm up the fuel cell while effectively unfreezing the drain valve.

In other words, in the fuel cell system, it is possible to cause the circulation flow path or a portion of the fuel gas supply flow path farther downstream than the connecting section to be in communication with the downstream side of the drain valve of the connecting flow path, via the distribution flow path, by opening the opening and closing valve. Due to this, the discharge gas or the mixed gas which is a combination of the discharge gas and the fuel gas supplied to the fuel gas supply flow path, can be made to flow through the downstream side of the drain valve of the connecting flow path.

Therefore, it is possible to supply the fuel gas contained in the discharge gas or the mixed gas, instead of the discharge fluid, along with the oxygen-containing gas to the cathode, and to thereby cause the exothermic reaction in the cathode catalyst. Furthermore, the discharge gas or the mixed gas containing the discharge gas heated in the manner described above is supplied to a region near the drain valve of the connecting flow path, and therefore the drain valve can be heated by the heat of the mixed gas or the discharge gas. Alternatively, the drain valve can also be heated by the heat of the fuel exhaust gas that has flowed into the gas-liquid separator as well.

As a result, according to the fuel cell system, even when the drain valve is frozen, it is possible to quickly warm up the fuel cell while effectively unfreezing the drain valve.

In the fuel cell system described above, it is preferable that the connecting section is provided with an ejector configured to mix together the fuel gas supplied to the fuel gas supply flow path and discharge gas discharged from the gas discharge port to the circulation flow path, the ejector is supplied with the fuel gas via a solenoid valve, and the distribution flow path causes a portion of the fuel gas supply flow path farther downstream than the ejector to be in communication with the downstream side of the drain valve in the connecting flow path.

In this case, when the opening and closing valve is opened, the mixed gas on the downstream side of the ejector flows through the downstream side of the drain valve of the connecting flow path via the distribution flow path, and therefore the solenoid valve provided on the upstream side of the ejector increases the flow rate of the fuel gas ejected in this ejector. Due to this, the suction force exerted on the discharge gas by the ejector increases, and therefore it is possible to improve the circulation efficiency of the circulated gas that is circulated through the downstream side of the ejector in the fuel gas supply flow path, the fuel exhaust gas flow path, and the circulation flow path, without using a pump or the like. As a result, the power generation reaction is encouraged with a simple configuration, and it is possible to quickly warm up the fuel cell.

In the fuel cell system described above, it is preferable that a temperature sensor configured to detect a temperature of the fuel cell system, and a control unit configured to issue valve opening instructions to both the opening and closing valve and the drain valve, when a detection result of the temperature sensor is less than or equal to a drain valve prioritization temperature, which is set in advance, at a time when a warm-up of the fuel cell begins are further included, and that the drain valve opens and closes due to energization. For example, the valve opening instructions are issued to both the opening and closing valve and the drain valve if the detection result of the temperature sensor is less than or equal to the drain valve heating prioritization temperature at which the degree of freezing of the drain valve is judged to be large due to the temperature thereof being significantly below 0° C.

In this case, there is a high probability that the drain valve is not open, even though the valve opening instructions were issued. However, by opening the opening and closing valve and causing the mixed gas to flow through the downstream side of the drain valve of the connecting flow path, it is possible to supply the cathode with the fuel gas contained in the mixed gas while heating the drain valve with the heat of the mixed gas, and thereby cause the exothermic reaction. At this time, sine the valve opening instructions have been issued to the drain valve as well, it is possible to generate heat with energization and heat the drain valve. Accordingly, it is possible to prioritize heating of the drain valve and effectively unfreeze the drain valve.

In the fuel cell system described above, it is preferable that, if the detection result of the temperature sensor is greater than the drain valve heating prioritization temperature at the time when the warm-up begins, the control unit issues the valve opening instructions only to the opening and closing valve, and issues the valve opening instructions to the drain valve after it is detected that the detection result of the temperature sensor is greater than or equal to a drain valve unfreezing temperature that is set in advance. For example, if it is judged that the detection result of the temperature sensor is greater than the drain valve heating prioritization temperature and the degree of freezing of the drain valve is small, first, the valve opening instructions are issued to the opening and closing valve.

Due to this, it is possible to cause only the mixed gas containing a small amount of water and a high concentration of fuel gas, compared to the discharge fluid discharged from the liquid discharge port, to flow through the oxygen-containing gas supply flow path, via the distribution flow path. Therefore, it is possible to more effectively cause the exothermic reaction in the cathode catalyst than in a case of opening the opening and closing valve together with the drain valve. Furthermore, compared to a case where the drain valve is opened, the pressure of the circulated gas circulating through a downstream side of the connecting section in the fuel gas supply flow path, the fuel exhaust gas flow path, and the circulation flow path can be increased, and thus it is possible to encourage the power generation reaction by efficiently supplying the fuel gas to the anode. As a result, the fuel cell can be heated with priority.

If the detection result of the temperature sensor is greater than or equal to the drain valve unfreezing temperature at which it is judged that the drain valve is not frozen, for example, the valve opening instructions are issued to the drain valve as well. Due to this, it is possible to effectively use the discharge liquid discharged from the liquid discharge port via the drain valve and thereby warm up the fuel cell.

In the fuel cell system described above, it is preferable that a pressure sensor configured to detect pressure of gas circulating through a portion of the fuel gas supply flow path farther downstream than the connecting section, the fuel exhaust gas flow path, and the circulation flow path is further included, and that the control unit judges whether the drain valve is open, based on a detection result of the pressure sensor. In this way, by basing the detection result of the pressure sensor, it is possible to easily and accurately judge whether the drain valve is actually open.

In the fuel cell system described above, it is preferable that, if it is judged that the drain valve is open after the valve opening instructions have been issued to each of the drain valve and the opening and closing valve, the control unit issues valve closing instructions to the opening and closing valve. In this way, by closing the opening and closing valve when it has been confirmed that the drain valve has opened in response to the valve opening instructions, it is possible to effectively use the discharge fluid discharged from the liquid discharge port via the drain valve to quickly warm up the fuel cell. Furthermore, it is possible to stop the consumption of the fuel gas in the exothermic reaction with the cathode, and to efficiently cause the power generation reaction in accordance with an increased ratio of consumption in the power generation reaction.

According to another aspect of the present invention, there is provided a control method of a fuel cell system for generating electric power by supplying fuel gas to an anode of a fuel cell via a fuel gas supply flow path and supplying an oxygen-containing gas to a cathode of the fuel cell via an oxygen-containing gas supply flow path, the control method including a freezing judgment step of judging whether a drain valve configured to discharge a discharge fluid from a liquid discharge port of a gas-liquid separator is frozen, the gas-liquid separator being configured to separate fuel exhaust gas discharged from the anode into a gas and a liquid, the discharge fluid including the liquid, wherein in the freezing judgment step, if it is judged that the drain valve is not frozen, the drain valve is kept in an open state and an unconsumed portion of the fuel gas contained in the discharge fluid is supplied along with the oxygen-containing gas to the cathode, and in the freezing judgment step, if it is judged that the drain valve is frozen, an opening and closing valve of a distribution flow path is kept in an open state, the distribution flow path being configured to distribute a discharge gas that is discharged from a gas discharge port of the gas-liquid separator or a mixed gas containing the discharge gas and the fuel gas supplied to the fuel gas supply flow path, to a downstream side of the drain valve in a connecting flow path configured to cause the liquid discharge port and the oxygen-containing gas supply flow path to be in communication with each other via the drain valve.

In this control method of the fuel cell system, if it is judged that the drain valve is not frozen in the freezing judgment step, in other words, if it is judged that the drain valve has opened due to the valve opening instructions, the unconsumed portion contained in the discharge fluid discharged from the liquid discharge port of the gas-liquid separator is supplied along with the oxygen-containing gas to the cathode. Due to this, it is possible to cause the exothermic reaction in the cathode catalyst. As a result, it is possible to heat the fuel cell using the heat of the exothermic reaction as well, and therefore the fuel cell can be warmed up quickly. Furthermore, the unconsumed portion contained in the discharge fluid, which otherwise would have been released into the atmosphere or the like, can be efficiently utilized, and therefore it is possible to increase the usage efficiency of the fuel gas supplied to the fuel cell system.

On the other hand, if it is judged that the drain valve is frozen in the freezing judgment step, in other words, if it is judged that the drain valve has not opened despite the valve opening instructions being issued, it is possible to supply the fuel gas contained in the discharge gas or the mixed gas along with the oxygen-containing gas to the cathode and cause the exothermic reaction in the cathode catalyst. Furthermore, since the discharge gas or mixed gas heated by the power generation described above is supplied near the drain valve of the connecting flow path, it is possible to heat the drain valve with the heat of the discharge gas or mixed gas. Accordingly, even when the exhaust valve is frozen, it is possible to quickly warm up the fuel cell while effectively unfreezing the drain valve.

In this control method of the fuel cell system, a selection step of, before the freezing judgment step, selecting which of heating the drain valve and heating the fuel cell is to be prioritized, based on a detection result of a temperature of the fuel cell system is preferably further included. In this case, the fuel cell and the drain valve can be heated at suitable timings according to the temperature of the fuel cell system, in other words, the degree of freezing of the drain valve, and therefore it is possible for the fuel cell system to start operating more quickly and smoothly.

In this control method of the fuel cell system, it is preferable that the opening and closing valve opens and closes by energization, in the selection step, if heating of the drain valve is selected to be prioritized, valve opening instructions are issued to both the opening and closing valve and the drain valve, and if heating of the fuel cell is selected to be prioritized, the valve opening instructions are issued only to the opening and closing valve, and the valve opening instructions are issued to the drain valve when the temperature of the fuel cell system reaches a temperature at which the drain valve unfreezes.

In this case, by issuing the valve opening instructions to both the drain valve and the opening and closing valve and thereby supplying the cathode with the fuel gas contained in the mixed gas or the discharge gas, it is possible to heat the drain valve with the heat of the discharge gas or the mixed gas while causing the exothermic reaction, and also to heat this drain valve by causing heat generation in the drain valve due to energization. Due to this, in particular, it is possible to heat the drain valve with priority.

On the other hand, if valve opening instructions are issued only to the opening and closing valve, it is possible to cause only the discharge gas or mixed gas containing a small amount of water and a high concentration of fuel gas, compared to the discharge fluid discharged from the liquid discharge port, to flow through the oxygen-containing gas supply flow path, via the distribution flow path. Therefore, it is possible to more effectively cause the exothermic reaction in the cathode catalyst. Furthermore, the pressure of the gas circulating through the fuel gas supply flow path, the fuel exhaust gas flow path, and the circulation flow path can be increased, in accordance with the closing of the drain valve, to encourage the power generation reaction. As a result, in particular, the fuel cell can be heated with priority. By issuing the valve opening instructions to the drain valve as well, after the temperature of the fuel cell system reaches a temperature at which the drain valve unfreezes, the fuel cell can be warmed up by effectively using the discharge fluid discharged from the liquid discharge port via the drain valve.

In this control method of the fuel cell system, it is preferable that, the freezing judgment step is performed in a state where the valve opening instructions have been issued to each of the drain valve and the opening and closing valve, and if it is judged that the drain valve is not frozen, valve closing instructions are issued to the opening and closing valve. In this case, it is possible to increase the ratio of the fuel gas consumed in the power generation reaction and thereby effectively cause the power generation reaction.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes examples of preferred embodiments of the fuel cell system and control method thereof according to the present invention, while referencing the accompanying drawings.

Figure 1:
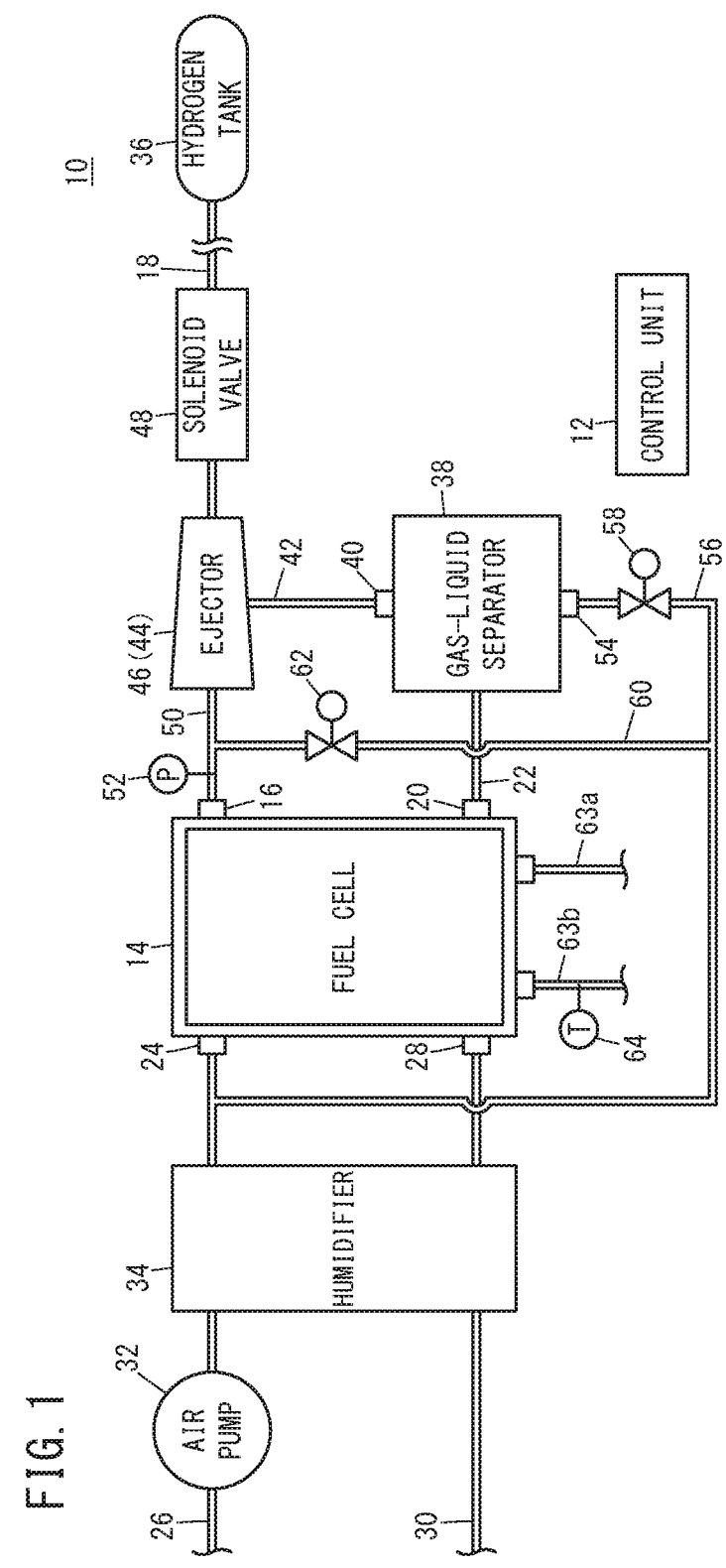
FIG. 1 is a schematic configurational view of a fuel cell system according to an embodiment of the present invention.

In the present embodiment, an example is described in which a fuel cell system 10 shown in FIG. 1 is mounted in a fuel cell vehicle (not shown in the drawings) such as a fuel cell electric automobile or the like, but the present invention is not particularly limited to this. For example, the fuel cell system 10 can be adopted in various moving bodies other than a fuel cell vehicle, or can be used as a stationary device.

The fuel cell system 10 includes a control unit 12 that control the fuel cell system 10 and a fuel cell 14 that is formed by a stack in which a plurality of power generation cells, not shown in the drawings, are stacked. Each power generation cell is formed by sandwiching, between a pair of separators, a membrane electrode assembly including an electrolyte membrane made of a solid polymer and an anode and cathode that sandwich this electrolyte membrane, the anode and the cathode facing each other. Power generation is performed by supplying the anode with fuel gas containing hydrogen and supplying the cathode with oxygen-containing gas that contains oxygen. Since the configuration of a power generation cell is widely known, drawings and a detailed description of the power generation cell are omitted.

In the fuel cell 14, a fuel gas supply flow path 18 for supplying the fuel gas is connected to a fuel gas supply port 16 of the anode, and a fuel exhaust gas flow path 22 for discharging the fuel exhaust gas is connected to a fuel exhaust gas discharge port 20 of the anode. Furthermore, an oxygen-containing gas supply flow path 26 for supplying the oxygen-containing gas is connected to an oxygen-containing gas supply port 24 of the cathode, and an oxygen-containing exhaust gas flow path 30 for discharging the oxygen-containing exhaust gas is connected to an oxygen-containing exhaust gas discharge port 28 of the cathode.

The oxygen-containing gas supply flow path 26 is provided with an air pump 32 and a humidifier 34, in the stated order form the upstream side thereof. By driving the air pump 32, air serving as the oxygen-containing gas is taken into the oxygen-containing gas supply flow path 26 from the atmosphere. This air is compressed by the air pump 32 and then supplied to the humidifier 34. In the humidifier 34, the oxygen-containing gas within the oxygen-containing gas supply flow path 26 and the oxygen-containing exhaust gas within the oxygen-containing exhaust gas flow path 30 are caused to exchange moisture, thereby humidifying the oxygen-containing gas before it is supplied to the cathode.

Hydrogen stored in a hydrogen tank 36 is supplied into the fuel gas supply flow path 18 as the fuel gas. A gas-liquid separator 38 that separates the fuel exhaust gas into a gas and a liquid is connected to the downstream side of the fuel exhaust gas flow path 22. Specifically, fuel exhaust gas containing an unconsumed portion of fuel gas that was not consumed by the anode (referred to below simply as an unconsumed portion), excess water, and the like flows into the gas-liquid separator 38 via the fuel exhaust gas flow path 22. A circulation flow path 42 is connected to a gas discharge port 40 of the gas-liquid separator 38. Therefore, discharge gas containing mainly the unconsumed portion with the liquid water having been separated therefrom is discharged from the gas discharge port 40 into the circulation flow path 42.

The downstream side of the circulation flow path 42 is connected to the fuel gas supply flow path 18. An ejector 46 is provided to a connecting section 44 that connects the circulation flow path 42 and the fuel gas supply flow path 18. The ejector 46 is supplied with the fuel gas via a solenoid valve or electromagnetic valve (injector) 48 provided on the upstream side of the ejector 46. Due to this, the ejector 46 mixes together the discharge gas and the fuel gas to create mixed gas, and discharges this mixed gas to the downstream side (mixed gas flow path 50) of the ejector 46 of the fuel gas supply flow path 18.

A pressure sensor 52 is provided in the mixed gas flow path 50. The pressure sensor 52 measures the pressure of circulated gas (mixed gas, fuel exhaust gas, and discharge gas) circulating through the mixed gas flow path 50, the fuel exhaust gas flow path 22, and the circulation flow path 42.

A liquid discharge port 54 of the gas-liquid separator 38 is connected to a connecting flow path 56. The connecting flow path 56 is in communication with the liquid discharge port 54 and the oxygen-containing gas supply flow path 26, via a drain valve 58 for discharging discharge fluid from the liquid discharge port 54. This drain valve 58 is opened and closed by energization (supplying electricity).

A gas-liquid separator, not shown in the drawings, may be provided between the downstream side of the drain valve 58 of the connecting flow path 56 and the oxygen-containing gas supply flow path 26. Due to this gas-liquid separator, the discharge fluid flows into the oxygen-containing gas supply flow path 26 in a state where the liquid in this discharge fluid has been separated.

The mixed gas flow path 50 and the downstream side of the drain valve 58 of the connecting flow path 56 are in communication with each other due to a distribution flow path 60. An opening and closing valve 62 that opens and closes the distribution flow path 60 is provided in the distribution flow path 60.

In the fuel cell 14, a coolant supply flow path 63a and a coolant discharge flow path 63b for supplying and discharging coolant are disposed in a coolant flow path (not shown in the drawings) provided in the fuel cell 14. In the present embodiment, a temperature sensor 64 is provided in the coolant discharge flow path 63b, and this temperature sensor 64 measures the temperature in the coolant discharge flow path 63b as the temperature of the fuel cell system 10.

The control unit 12 is configured as a microcomputer including a CPU and the like, not shown in the drawings, and this CPU executes prescribed computations in accordance with a control program, to perform various types of processing and control such as normal operation control and warm-up control of the fuel cell system 10. Furthermore, the control unit 12 outputs a control signal such as valve opening instructions or valve closing instructions to each configurational element such as the drain valve 58 or the opening and closing valve 62, based on detection signals received from each of the various sensors such as the pressure sensor 52 or the temperature sensor 64, for example.

Figure 2:
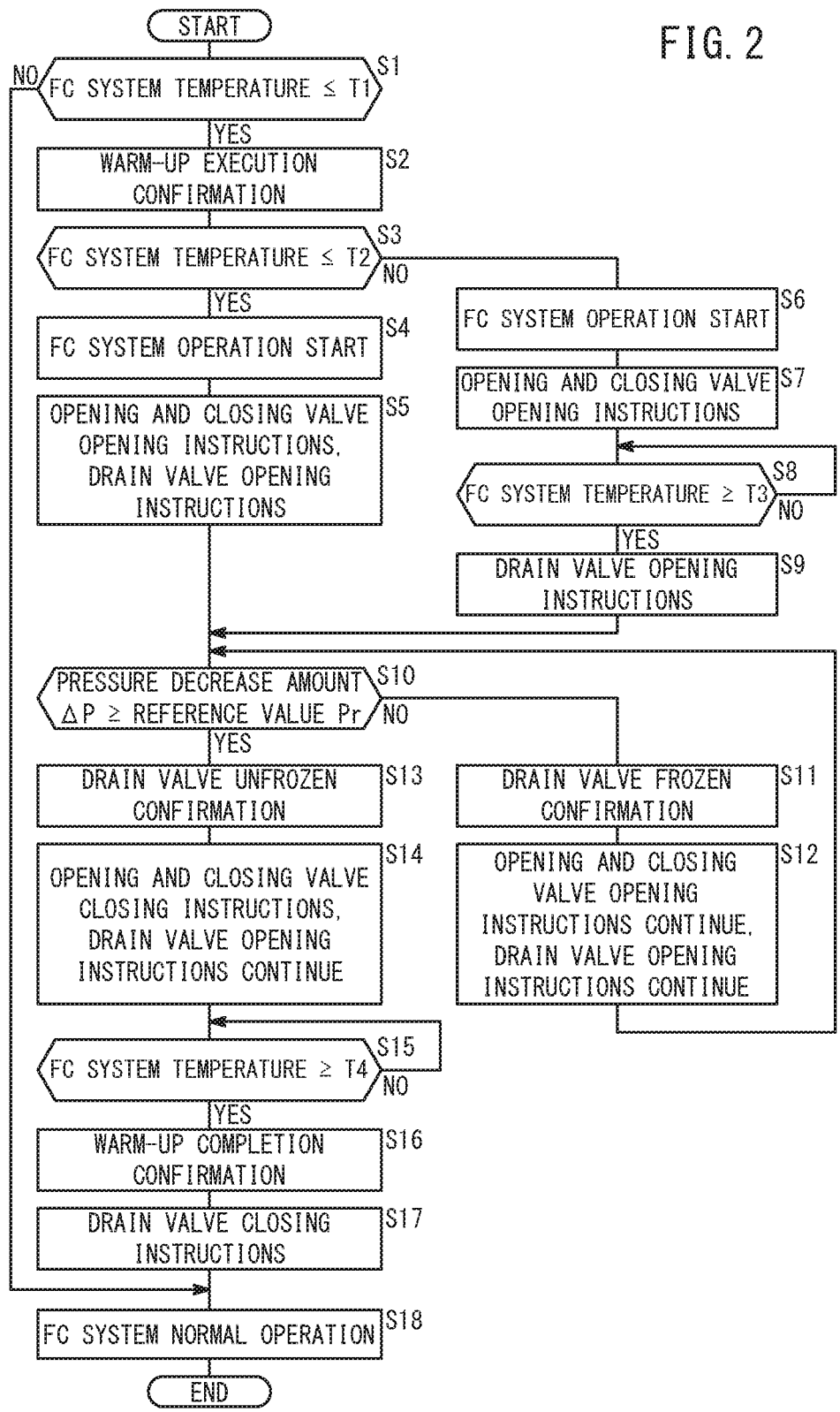
FIG. 2 is a flow chart describing a control method of the fuel cell system.

The following describes the control method of the fuel cell system 10 according to the present embodiment, while referencing the flow chart shown in FIG. 2.

First, at step S1, a judgment is made as to whether or not the temperature of the fuel cell system 10 detected by the temperature sensor 64 is less than or equal to a warm-up execution temperature T1 (i.e., whether the temperature of the fuel cell system≤T1). The warm-up execution temperature T1 is not particularly limited as long as it is a temperature judged to be necessary for warm-up of the fuel cell 14, and can be set to be below the freezing point near 0° C., for example.

At step S1, if it is judged that the temperature of the fuel cell system (FC system) 10 is greater than the warm-up execution temperature T1 (step S1: NO), the fuel cell system 10 begins normal operation without performing a warm-up.

At step S1, if it is judged that the temperature of the fuel cell system 10 is less than or equal to the warm-up execution temperature T1 (step S1: YES), warm-up execution of the fuel cell 14 is confirmed at step S2, and the process proceeds to step S3.

At step S3, a judgment is made as to whether or not the temperature of the fuel cell system 10 detected by the temperature sensor 64 is less than or equal to a drain valve heating prioritization temperature T2 (i.e., whether the temperature of FC system≤T2). The drain valve heating prioritization temperature T2 is a temperature at which the degree of freezing of the drain valve 58 is judged to be large due to the temperature dropping significantly below 0° and, as an example, is a temperature (e.g., −20° C.) that is below freezing and lower than the warm-up execution temperature T1. In other words, in this judgment, a selection is made about whether to prioritize heating of the drain valve 58 or heating of the fuel cell 14, based on the temperature of the fuel cell system 10, i.e. the degree of freezing of the drain valve 58 (selection step).

In step S3, if it is judged that the temperature of the fuel cell system 10 is less than or equal to the drain valve heating prioritization temperature T2 (step S3: YES), i.e., if the degree of freezing of the drain valve 58 is large, the process proceeds to step S4 to prioritize heating of the drain valve 58, and the operation of the fuel cell system 10 is started.

When operation of the fuel cell system 10 begins, the fuel gas is supplied from the hydrogen tank 36 to the fuel gas supply flow path 18, and also the oxygen-containing gas is supplied to the oxygen-containing gas supply flow path 26 due to the rotational effect of the air pump 32. The fuel gas supplied to the fuel gas supply flow path 18 is supplied to the anode through the solenoid valve 48 and the ejector 46. The oxygen-containing gas supplied to the oxygen-containing gas supply flow path 26 is supplied to the cathode, through the humidifier 34.

Due to this, the fuel gas and the oxygen-containing gas are consumed in an electrochemical reaction (power generation reaction) with the anode catalyst of the anode and the cathode catalyst of the cathode, thereby generating electric power. The coolant is supplied from the coolant supply flow path 63a to the coolant flow path of the fuel cell 14. The coolant flows through the coolant flow path, and is then discharged to the coolant discharge flow path 63b.

The oxygen-containing gas that has been supplied to the cathode and had a portion of its oxygen consumed is discharged to the oxygen-containing exhaust gas flow path 30 as the oxygen-containing exhaust gas. This oxygen-containing exhaust gas humidifies oxygen-containing gas that is newly supplied to the cathode, for example, in the humidifier 34, and is thereafter discharged to the outside of the fuel cell system 10.

The unconsumed portion of the fuel gas that was not consumed at the anode is discharged to the fuel exhaust gas flow path 22 as the fuel exhaust gas, and is then introduced into the gas-liquid separator 38. Due to this, the fuel exhaust gas is separated into discharge gas, which is a gas component, and discharge fluid, which is a liquid component. At this time, since the drain valve 58 is in a closed state, the discharge fluid is held on the upstream side of the drain valve 58.

By ejecting the fuel gas from the solenoid valve 48 to the upstream side of the ejector 46 in the manner described above, negative pressure is caused in the circulation flow path 42. Therefore, the discharge gas is sucked into the ejector 46 via the circulation flow path 42 and is mixed with the fuel gas supplied to the fuel gas supply flow path 18. Due to this, the mixed gas is discharged to the mixed gas flow path 50 on the downstream side of the ejector 46.

In other words, the unconsumed portion discharged from the anode as the fuel exhaust gas without being consumed in the power generation reaction has its liquid water separated, thereby becoming the discharge gas, and is then mixed with the fuel gas newly supplied to the fuel gas supply flow path 18 to become the mixed gas, which is supplied to the anode once again.

Furthermore, since the fuel exhaust gas is heated by the reaction heat of the power generation reaction, the temperature of the fuel exhaust gas is higher than the temperature of the fuel gas newly supplied to the fuel gas supply flow path 18. Accordingly, the discharge gas obtained by passing the fuel exhaust gas through the gas-liquid separator 38 and the mixed gas containing this discharge gas also have higher temperatures, in the same manner as the fuel exhaust gas.

Next, at step S5, valve opening instructions are issued to both the opening and closing valve 62 and the drain valve 58. In this case, as described above, the degree of freezing of the drain valve 58 is judged to be large, and therefore there is a high probability that the drain valve 58 is not open despite the valve opening instructions having been issued thereto. On the other hand, when the opening and closing valve 62 opens in response to the valve opening instructions, the mixed gas flow path 50 and the downstream side of the drain valve 58 of the connecting flow path 56 come into communication with each other, via the distribution flow path 60. As a result, the mixed gas within the mixed gas flow path 50 is distributed to the downstream side of the drain valve 58 of the connecting flow path 56. The downstream side of the drain valve 58 of the connecting flow path 56 is in communication with the oxygen-containing gas supply flow path 26, and therefore the fuel gas contained in the mixed gas is supplied along with the oxygen-containing gas to the cathode. Due to this, the exothermic reaction occurs in the cathode catalyst. Due to this exothermic reaction and the power generation reaction described above, the fuel cell 14 is heated quickly.

Furthermore, since the mixed gas heated in the manner described above is supplied near the drain valve 58 of the connecting flow path 56, the drain valve 58 is heated by the heat of this mixed gas. Furthermore, since the valve opening instructions are issued to the drain valve 58, heating caused by energization to the drain valve occurs. Accordingly, it is possible to heat the drain valve 58 with priority. It should be noted that the drain valve 58 is also heated by the heat of the fuel exhaust gas flowing into the gas-liquid separator 38.

By heating the drain valve 58 in the manner described above, if the drain valve 58 is unfrozen and opens or if the drain valve 58 opens in response to the valve opening instructions described above, the discharge fluid flows through the downstream side of the drain valve 58 of the connecting flow path 56. This discharge fluid also contains the unconsumed portion. In particular, immediately after the operation of the fuel cell system 10 is started, there is relatively little liquid contained in the fuel exhaust gas, and therefore it is easy for the unconsumed portion to be discharged as the discharge fluid from the liquid discharge port 54.

Accordingly, by opening the drain valve 58, the unconsumed portion contained in the discharge fluid flows into the oxygen-containing gas supply flow path 26 via the connecting flow path 56. Due to this, the cathode is supplied with the unconsumed portion contained in the discharge fluid, in addition to the fuel gas contained in the mixed gas described above.

On the other hand, in step S3, if it is judged that the temperature of the fuel cell system 10 is greater than the drain valve heating prioritization temperature T2 (step S3: NO), i.e., if it is judged that the degree of freezing of the drain valve 58 is small, the process proceeds to step S6 to select prioritization of the heating of the fuel cell 14, and the operation of the fuel cell system 10 starts in the same manner as described above.

Next, at step S7, the valve opening instructions are issued only to the opening and closing valve 62. Due to this, it is possible to supply the cathode with only the mixed gas containing a small amount of water and a high concentration of fuel gas, compared to the discharge fluid discharged from the liquid discharge port 54, via the distribution flow path 60, the connecting flow path 56, and the oxygen-containing gas supply flow path 26. Therefore, it is possible to more effectively cause the exothermic reaction in the cathode catalyst than in a case of opening the opening and closing valve together with the drain valve 58. Furthermore, compared to a case where the drain valve 58 is opened, the pressure of the circulated gas is higher and the fuel gas can be more efficiently supplied to the anode. Accordingly, it is possible to encourage the power generation reaction. As a result, the fuel cell 14 can be heated with priority.

Next, at step S8, a judgment is made as to whether or not the temperature of the fuel cell system 10 detected by the temperature sensor 64 is greater than or equal to a drain valve unfreezing temperature T3 (i.e., whether the temperature of FC system≥T3). The drain valve unfreezing temperature T3 is a temperature at which it is judged that the drain valve 58 does not freeze. In other words, at step S8, a judgment is made as to whether the drain valve 58 has reached an unfreezing temperature.

At step S8, if it is judged that the temperature of the fuel cell system 10 is less than the drain valve unfreezing temperature T3 (step S8: NO), the process of step S8 is repeated until the temperature of the fuel cell system 10 becomes greater than or equal to the drain valve unfreezing temperature T3.

At step S8, if it is judged that the temperature of the fuel cell system 10 is greater than or equal to the drain valve unfreezing temperature T3 (step S8: YES), the process proceeds to step S9 and the valve opening instructions are issued to the drain valve 58 as well. When the drain valve 58 has opened in response to these valve opening instructions, the unconsumed portion contained in the discharge fluid is supplied, in addition to the mixed gas, to the cathode.

After the valve opening instructions are issued to the drain valve 58 in step S5 or step S9, a judgment is made at step S10 as to whether the drain valve 58 is actually open. In this judgment, if the drain valve 58 is closed despite the valve opening instructions having been issued, it is judged that the drain valve 58 is frozen. On the other hand, if the drain valve 58 opens in response to the valve opening instructions, it is judged that the drain valve 58 is not frozen. In other words, a judgment is made as to whether the drain valve 58 is frozen (freezing judgment step).

Specifically, the magnitude of the decrease in the pressure of the circulated gas detected by the pressure sensor 52 (pressure decrease amount $\Delta P$) before and after the valve open instructions were issued to the drain valve 58 is obtained, and a judgment is made as to whether or not this pressure decrease amount $\Delta P$ is greater than or equal to a reference value Pr (i.e., whether $\Delta P \geq Pr$). The reference value Pr can be set by measuring in advance the pressure of the circulated gas in a state where the drain valve 58 is closed and the pressure of the circulated gas in a state where the drain valve 58 is open, and then setting the difference between these pressures to be the reference value Pr.

At step S10, if the pressure decrease amount $\Delta P$ is less than the reference value Pr, in other words, if it is judged that the drain valve 58 is frozen (step S10: NO), after freezing of the drain valve 58 is confirmed at step S11, the valve opening instructions continue to be issued to the drain valve 58 and the opening and closing valve 62 at step S12. The processes of steps S10 to S12 are repeated until the pressure decrease amount $\Delta P$ becomes greater than or equal to the reference value Pr.

At step S10, if the pressure decrease amount $\Delta P$ is greater than or equal to the reference value Pr, in other words, if it is judged that the drain valve 58 is not frozen (step S10: YES), after the drain valve 58 is confirmed to be unfrozen at step S13, the valve closing instructions are issued to the opening and closing valve 62 at step S14. On the other hand, the valve opening instructions continue to be issued to the drain valve 58.

Due to this, the distribution of the mixed gas to the downstream side of the drain valve 58 of the connecting flow path 56 is stopped, and therefore only the discharge fluid is supplied to the oxygen-containing gas supply flow path 26 via the connecting flow path 56. In this case, mixed gas having a high mixture concentration of fuel gas is supplied to the anode without being distributed to the cathode, and therefore the percentage of the fuel gas that is consumed in the power generation reaction is increased, and it is possible to maintain high power generation efficiency.

Next, at step S15, a judgment is made as to whether or not the temperature of the fuel cell system 10 detected by the temperature sensor 64 is greater than or equal to a warm-up completion temperature T4 (i.e., whether the temperature of FC system≥T4). The warm-up completion temperature 14 is a temperature at which the warm-up of the fuel cell 14 is judged to be completed, and can be set to be 60° C., for example.

At step S15, if it is judged that the temperature of the fuel cell system 10 is less than the warm-up completion temperature 14 (step S15: NO), the process of step S15 is repeated until the temperature of the fuel cell system 10 becomes greater than or equal to the warm-up completion temperature 14.

At step S15, if it is judged that the temperature of the fuel cell system 10 is greater than or equal to the warm-up completion temperature 14 (step S15: YES), the process proceeds to step S16 to confirm the warm-up completion, after which the valve closing instructions are issued to the drain valve 58 at step S17. By closing the drain valve 58 according to the valve closing instructions, the supply of the discharge fluid to the cathode is stopped.

Next, at step S18, the normal operation of the fuel cell system 10 begins. After the process of step S18, the flow chart according to the present embodiment is ended.

As described above, with the fuel cell system 10 and control method thereof according to the present embodiment, if the drain valve 58 is not frozen when the warm-up of the fuel cell 14 begins, the drain valve 58 is opened and the unconsumed portion contained in the discharge fluid flows into the oxygen-containing gas supply flow path 26 via the connecting flow path 56. Due to this, the unconsumed portion contained in the discharge fluid is supplied along with the oxygen-containing gas to the cathode, and the exothermic reaction can be caused in the cathode catalyst.

Accordingly, since the fuel cell 14 can be heated by the heat of the exothermic reaction in the cathode catalyst as well as by the heat of the power generation reaction of the fuel cell 14, it is possible to quickly warm up the fuel cell 14. Furthermore, in normal cases, the unconsumed portion contained in the discharge fluid released into the atmosphere or the like can be efficiently utilized, and therefore it is possible to increase the usage efficiency of the fuel gas supplied to the fuel cell system 10. In this case, it is also possible to remove the need for equipment for diluting the unconsumed portion contained in the discharge fluid, or the like.

On the other hand, if the drain valve 58 is frozen when the warm-up of the fuel cell 14 begins, the opening and closing valve 62 is opened and the mixed gas flows through the downstream side of the drain valve 58 of the connecting flow path 56, via the distribution flow path 60. Due to this, the fuel gas contained in the mixed gas, instead of the discharge fluid, is supplied along with the oxygen-containing gas to the cathode, and it is possible to cause the exothermic reaction in the cathode catalyst. Furthermore, since the mixed gas that has been heated in the manner described above is supplied near the drain valve 58 of the connecting flow path 56, it is possible to heat the drain valve 58 with the heat of this mixed gas. It should be noted that the drain valve 58 can also be heated with the heat of the fuel exhaust gas that has flowed into the gas-liquid separator 38.

Accordingly, even in a case where the drain valve 58 is frozen so that the unconsumed portion contained in the discharge fluid cannot be supplied to the cathode, it is possible to quickly warm up the fuel cell 14 while effectively unfreezing the drain valve 58.

As described above, the ejector 46 is provided in the connecting section 44 between the fuel gas supply flow path 18 and the circulation flow path 42, and the fuel gas is supplied to this ejector 46 via the solenoid valve 48. Furthermore, the distribution flow path 60 forms communication between the downstream side of the drain valve 58 of the connecting flow path 56 and the mixed gas flow path 50, which is farther downstream than the ejector 46 of the fuel gas supply flow path 18.

In this case, when the opening and closing valve 62 is opened, the mixed gas on the downstream side of the ejector 46 flows through the downstream side of the drain valve 58 of the connecting flow path 56 via the distribution flow path 60, and therefore the solenoid valve 48 provided on the upstream side of the ejector 46 increases the flow rate of the fuel gas ejected into this ejector 46. Due to this, the suction force exerted on the discharge gas by the ejector 46 also increases, and the circulation efficiency of the circulated gas can be improved without using a pump or the like. As a result, the power generation reaction is encouraged with a simple configuration, and the warm-up of the fuel cell 14 can be performed quickly.

As described above, before the freezing judgment step, the selection step is performed to select which of the heating of the drain valve 58 and the heating of the fuel cell 14 is to be prioritized, based on the detection result of the temperature of the fuel cell system 10. In this case, it is possible to heat the fuel cell 14 and the drain valve 58 at suitable timings according to the temperature of the fuel cell system 10, in other words, the degree of freezing of the drain valve 58, and therefore it is possible to start the operation of the fuel cell system 10 more quickly and smoothly.

As described above, in the freezing judgment step, the judgment as to whether the drain valve 58 is open is based on the detection results of the pressure sensor 52 before and after the valve opening instructions are issued to the drain valve 58. In this way, by basing this judgment on the detection results of the pressure sensor 52, it is possible for the judgment as to whether the drain valve 58 is actually open to be made easily and with high accuracy.

The present invention is not limited to the embodiments described above, and various alterations can be made without deviating from the scope of the present invention.

For example, in the fuel cell system 10 according to the embodiment described above, the mixed gas is distributed to the downstream side of the drain valve 58 of the connecting flow path 56 by causing the mixed gas flow path 50 and the downstream side of the drain valve 58 of the connecting flow path 56 to be in communication with each other through the distribution flow path 60 and opening the opening and closing valve 62. However, the distribution flow path 60 may cause the circulation flow path 42 and the downstream side of the drain valve 58 of the connecting flow path 56 to be in communication with each other. In this case, the discharge gas is distributed to the downstream side of the drain valve 58 of the connecting flow path 56 by opening the opening and closing valve 62. In this way, the discharge gas is not mixed with the fuel gas, and thus the discharge gas having a temperature higher than the mixed gas flows near the drain valve 58. Therefore, it is possible to more effectively heat the drain valve 58.

In the embodiment described above, the temperature sensor 64 is provided in the coolant discharge flow path 63b, and the temperature sensor 64 measures the temperature of the coolant discharge flow path 63b as the temperature of the fuel cell system 10. However, as long as it is possible to measure the temperature of the fuel cell system 10, the location where the temperature sensor 64 is provided is not particularly limited. Similarly, the location where the pressure sensor 52 is installed is not limited to the mixed gas flow path 50, as long as the pressure sensor 52 is provided at a location enabling detection of the pressure of the mixed gas.

In the embodiment described above, the ejector 46 is provided to the connecting section 44, but the present invention is not particularly limited to this. For example, instead of providing the ejector 46, a pump or the like, not shown in the drawings, may be provided to the circulation flow path 42 to circulate the circulated gas.

What is claimed is:

1. A fuel cell system for generating electric power by supplying fuel gas to an anode of a fuel cell via a fuel gas supply flow path and supplying an oxygen-containing gas to a cathode of the fuel cell via an oxygen-containing gas supply flow path, the fuel cell system comprising:
   a fuel exhaust gas flow path configured to allow fuel exhaust gas discharged from the anode to flow therethrough;
   a gas-liquid separator into which the fuel exhaust gas flows via the fuel exhaust gas flow path, the gas-liquid separator being configured to separate the fuel exhaust gas into a gas and a liquid;
   a circulation flow path configured to cause a gas discharge port of the gas-liquid separator and the fuel gas supply flow path to be in communication with each other;
   a connecting flow path configured to cause a liquid discharge port of the gas-liquid separator to be in communication with the oxygen-containing gas supply flow path, via a drain valve;
   a control unit programmed to issue valve opening instructions to: the opening and closing valve, the drain valve, or both the opening and closing valve and the drain valve:
   a distribution flow path configured to cause either the circulation flow path or a portion of the fuel gas supply flow path that is on a downstream side of a connecting section connecting to the circulation flow path to be in communication with a portion near the drain valve on a downstream side of the drain valve in the connecting flow path; and
   an opening and closing valve configured to open and close the distribution flow path, wherein
   the distribution flow path is opened to flow a mixed gas flowing through the fuel gas supply flow path on the downstream side of the connecting section or a discharge gas flowing through the circulation flow path, into the oxygen-containing gas supply flow path via the portion on the downstream side of the drain valve in the connecting flow path, and
   wherein the opening and closing valve is in an open state, the drain valve is heated by heat of the mixed gas or heat of the discharge gas.

2. The fuel cell system according to claim 1, wherein
   the connecting section is provided with an ejector configured to mix together the fuel gas supplied to the fuel gas supply flow path and discharge gas discharged from the gas discharge port to the circulation flow path,
   the ejector is supplied with the fuel gas via a solenoid valve, and
   the distribution flow path causes a portion of the fuel gas supply flow path farther downstream than the ejector to be in communication with the downstream side of the drain valve in the connecting flow path.

3. The fuel cell system according to claim 1, further comprising:
   a temperature sensor configured to detect a temperature of the fuel cell system;
   wherein the control unit is programmed to issue valve opening instructions to both the opening and closing valve and the drain valve when a detection result of the temperature sensor is less than or equal to a drain valve heating prioritization temperature, which is set in advance, at a time when a warm-up of the fuel cell begins, and wherein
   the drain valve opens and closes due to energization.

4. The fuel cell system according to claim 3, wherein
   the control unit is programmed to issue the valve opening instructions only to the opening and closing valve when the detection result of the temperature sensor is greater than the drain valve heating prioritization temperature at the time when the warm-up begins; and
   the control unit is programmed to issue the valve opening instructions to the drain valve after it is detected that the detection result of the temperature sensor is greater than or equal to a drain valve unfreezing temperature that is set in advance.

5. The fuel cell system according to claim 3, further comprising:
   a pressure sensor configured to detect pressure of gas circulating through a portion of the fuel gas supply flow path farther downstream than the connecting section, the fuel exhaust gas flow path, and the circulation flow path, wherein
   the control unit is programmed to judge whether the drain valve is open, based on a detection result of the pressure sensor.

6. The fuel cell system according to claim 5, wherein
   if it is judged that the drain valve is open after the valve opening instructions have been issued to each of the drain valve and the opening and closing valve, the control unit is programed to issue valve closing instructions to the opening and closing valve.

7. A control method of a fuel cell system for generating electric power by supplying fuel gas to an anode of a fuel cell via a fuel gas supply flow path and supplying an oxygen-containing gas to a cathode of the fuel cell via an oxygen-containing gas supply flow path, the control method comprising:
   a freezing judgment step of judging, by a control unit, whether a drain valve configured to discharge a discharge fluid from a liquid discharge port of a gas-liquid separator is frozen, the gas-liquid separator being configured to separate fuel exhaust gas discharged from the anode into a gas and a liquid, the discharge fluid including the liquid, wherein the control unit is programmed to issue valve opening instructions to: an opening and closing valve, the drain valve, or both an opening and closing valve and the drain valve, wherein
   in the freezing judgment step, if it is judged that the drain valve is not frozen, the drain valve is kept in an open state and an unconsumed portion of the fuel gas contained in the discharge fluid is supplied along with the oxygen-containing gas to the cathode, and
   in the freezing judgment step, if it is judged that the drain valve is frozen, the opening and closing valve of a distribution flow path is kept in an open state, the distribution flow path being configured to distribute a discharge gas that is discharged from a gas discharge port of the gas-liquid separator or a mixed gas containing the discharge gas and the fuel gas supplied to the fuel gas supply flow path, to a downstream side of the drain valve in a connecting flow path configured to cause the liquid discharge port and the oxygen-containing gas supply flow path to be in communication with each other via the drain valve, the mixed gas or the discharged gas is supplied to a portion near the drain valve in the connecting flow path to heat the drain valve by heat of the mixed gas or heat of the discharge gas.

8. The control method of the fuel cell system according to claim 7, further comprising:
   a selection step of, before the freezing judgment step, selecting which of heating the drain valve and heating the fuel cell is to be prioritized, based on a detection result of a temperature of the fuel cell system.

9. The control method of the fuel cell system according to claim 8, wherein
the opening and closing valve opens and closes by energization,
in the selection step, if heating of the drain valve is selected to be prioritized, the valve opening instructions are issued to both the opening and closing valve and the drain valve, and
if heating of the fuel cell is selected to be prioritized, the valve opening instructions are issued only to the opening and closing valve, and the valve opening instructions are issued to the drain valve when the temperature of the fuel cell system reaches a temperature at which the drain valve unfreezes.

10. The control method of the fuel cell system according to claim 9, wherein
the freezing judgment step is performed in a state where the valve opening instructions have been issued to each of the drain valve and the opening and closing valve, and if it is judged that the drain valve is not frozen, valve closing instructions are issued to the opening and closing valve.

* * * * *